(12) United States Patent
Sauper et al.

(10) Patent No.: US 10,509,832 B2
(45) Date of Patent: Dec. 17, 2019

(54) GENERATING SNIPPET MODULES ON ONLINE SOCIAL NETWORKS

(71) Applicant: Facebook, Inc., Menlo Park, CA (US)

(72) Inventors: Christina Joan Sauper, San Francisco, CA (US); Quang Xuan Do, London (GB); Ling Bao, Redwood City, CA (US); Bosmat Mazal Eldar, Menlo Park, CA (US); Kedar Bellare, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 751 days.

(21) Appl. No.: 14/797,819

(22) Filed: Jul. 13, 2015

(65) Prior Publication Data

US 2017/0017721 A1    Jan. 19, 2017

(51) Int. Cl.

| | | |
|---|---|---|
| *G06F 7/00* | (2006.01) | |
| *G06F 16/9535* | (2019.01) | |
| *G06F 16/248* | (2019.01) | |
| *G06F 16/2457* | (2019.01) | |

(52) U.S. Cl.
CPC ........ *G06F 16/9535* (2019.01); *G06F 16/248* (2019.01); *G06F 16/24575* (2019.01)

(58) Field of Classification Search
CPC .................................................. G06F 16/9535
USPC ........................................................ 707/784
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,836,044 B2 | 11/2010 | Kamvar |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |

(Continued)

*Primary Examiner* — Eliyah S. Harper
(74) *Attorney, Agent, or Firm* — Baker Botts L.L.P.

(57) ABSTRACT

In one embodiment, a method includes accessing posts of an online social network, each post being associated with a first entity of the online social network, classifying, based on content and metadata associated with each post, one or more of the posts as being relevant to the first entity, extracting a set of one or more n-grams from the content of the posts classified as being relevant to the first entity, filtering the set of n-grams to remove one or more of the extracted n-grams from the set of n-grams, calculating a quality score for each n-gram in the filtered set of n-grams, generating a snippet-module including one or more of the extracted n-grams from the filtered set of n-grams having quality-scores greater than a threshold quality-score, and sending, to a client system of a first user of the online social network, the snippet-module for display to the user.

39 Claims, 8 Drawing Sheets

(56) References Cited

U.S. PATENT DOCUMENTS

| | | |
|---|---|---|
| 8,271,471 B1 | 9/2012 | Kamvar |
| 8,271,546 B2 | 9/2012 | Gibbs |
| 8,275,771 B1 * | 9/2012 | Malpani ............... G06F 16/954 707/737 |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,626,768 B2 * | 1/2014 | Bailey ................. G06F 16/358 707/738 |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 * | 10/2014 | Lee ...................... G06Q 50/01 707/771 |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,275,101 B2 * | 3/2016 | Rubinstein .............. G06Q 50/01 |
| 9,916,348 B1 * | 3/2018 | Madhavan ........ G06F 16/24578 |
| 9,940,367 B1 * | 4/2018 | Baker ................ G06F 16/9535 |
| 10,176,265 B2 * | 1/2019 | Alonso ............... G06F 16/9535 |
| 10,180,964 B1 * | 1/2019 | Baker ............... G06F 16/24578 |
| 10,372,739 B2 * | 8/2019 | Mittal ................ G06F 16/3347 |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0277100 A1 | 11/2007 | Sheha |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 * | 9/2009 | Ismalon ................. G06Q 30/02 705/319 |
| 2009/0259624 A1 * | 10/2009 | DeMaris ........... G06F 16/24534 |
| 2009/0265326 A1 * | 10/2009 | Lehrman ............ G06F 16/9535 |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2009/0319342 A1 * | 12/2009 | Shilman ............ G06F 17/30864 705/7.41 |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 * | 12/2011 | Groeneveld .......... G06F 16/345 707/706 |
| 2011/0320470 A1 * | 12/2011 | Williams ............. G06F 16/951 707/767 |
| 2012/0047147 A1 | 2/2012 | Redstone |
| 2012/0059708 A1 | 3/2012 | Galas |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0041876 A1 | 2/2013 | Dow |
| 2013/0066876 A1 | 3/2013 | Raskino |
| 2013/0073346 A1 * | 3/2013 | Chun ................ G06Q 30/0281 705/7.39 |
| 2013/0073400 A1 | 3/2013 | Heath |
| 2013/0085970 A1 | 4/2013 | Karnik |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0246404 A1 | 9/2013 | Annau |
| 2014/0006416 A1 | 1/2014 | Leslie |
| 2014/0067535 A1 | 3/2014 | Rezaei |
| 2014/0122465 A1 | 5/2014 | Bilinski |

(56) References Cited

U.S. PATENT DOCUMENTS

2014/0337371 A1* 11/2014 Li ................... G06F 17/30958
707/767
2016/0357870 A1* 12/2016 Hentschel ......... G06F 17/30867

* cited by examiner

*FIG. 3*

GENERATING SNIPPET MODULES ON ONLINE SOCIAL NETWORKS

TECHNICAL FIELD

This disclosure generally relates to identifying information related to objects within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual users within the networks, and edges represent the relationships between the users. The resulting graph-based structures are often very complex. In its simplest form, a social graph is a map of all of the relevant edges between all the nodes being studied.

SUMMARY OF PARTICULAR EMBODIMENTS

In particular embodiments, a social-networking system may generate a snippet-module to display highlights of an entity on the online social network. The highlights may be extracted from content objects, such as posts, comments, reviews, and messages, associated with the entity on the online social network. The snippet-module may beneficially reduce the number of content objects to be highlighted for the entity to a small set of relevant phrases so that the user need not sift through all the content objects before making informed decisions associated with the entity. The entity may be, for example, a restaurant, celebrity, group, event, or other type of entity. The posts may include a publication created by a user on a newsfeed page or homepage, on the user's own page (e.g. a post), the entity's profile-page (e.g. a review), on a page of one of the user's friends, or on a page of a group. The social-networking system may generate and present the snippet-module in a profile-page or in a search-results page on the online social network, and the snippet-module may display noun phrases extracted from posts associated with the entity. Each of the extracted noun phrases may correspond to an n-gram from a content object associated with the entity. As an example, for a restaurant entity "Lulu's Cafe," the social-networking system may generate a snippet-module in the restaurant's profile-page. The snippet-module may display a list of the top-five-scoring n-grams extracted from posts associated with the restaurant entity. The top-five-scoring n-grams in this example may be "royale sandwich," beet bruschetta," "blueberry muffin bread," lemony kale," and "trout scramble."

In particular embodiments, to generate a snippets-module, the social-networking system may access posts on the online social network associated with an entity. Each of the posts may be classified as being relevant, e.g., review-like, or irrelevant to the entity. That is, the system can identify posts that are not categorized by users as reviews, but are sufficiently review-like to be used as sources of review information. A set of n-grams that represent noun phrases may be extracted from the relevant posts. The extracted n-grams may then be filtered by removing redundant or non-informative noun phrases. A quality-score may then be calculated for each n-gram in the filtered set of n-grams. For example, the quality-score for each n-gram may be calculated based at least on a term frequency-inverse document frequency (TF-IDF) of the n-gram. A snippet-module may then be generated to display n-grams (e.g., snippets) from the filtered set of n-grams having quality-scores greater than a threshold quality-score. The social-networking system may then send the snippet-module to a client system of a user of the online social network for display to the user.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3 illustrates an example portion of a profile page that includes an example snippet-module.

DESCRIPTION OF EXAMPLE EMBODIMENTS

System Overview

Figure 1:
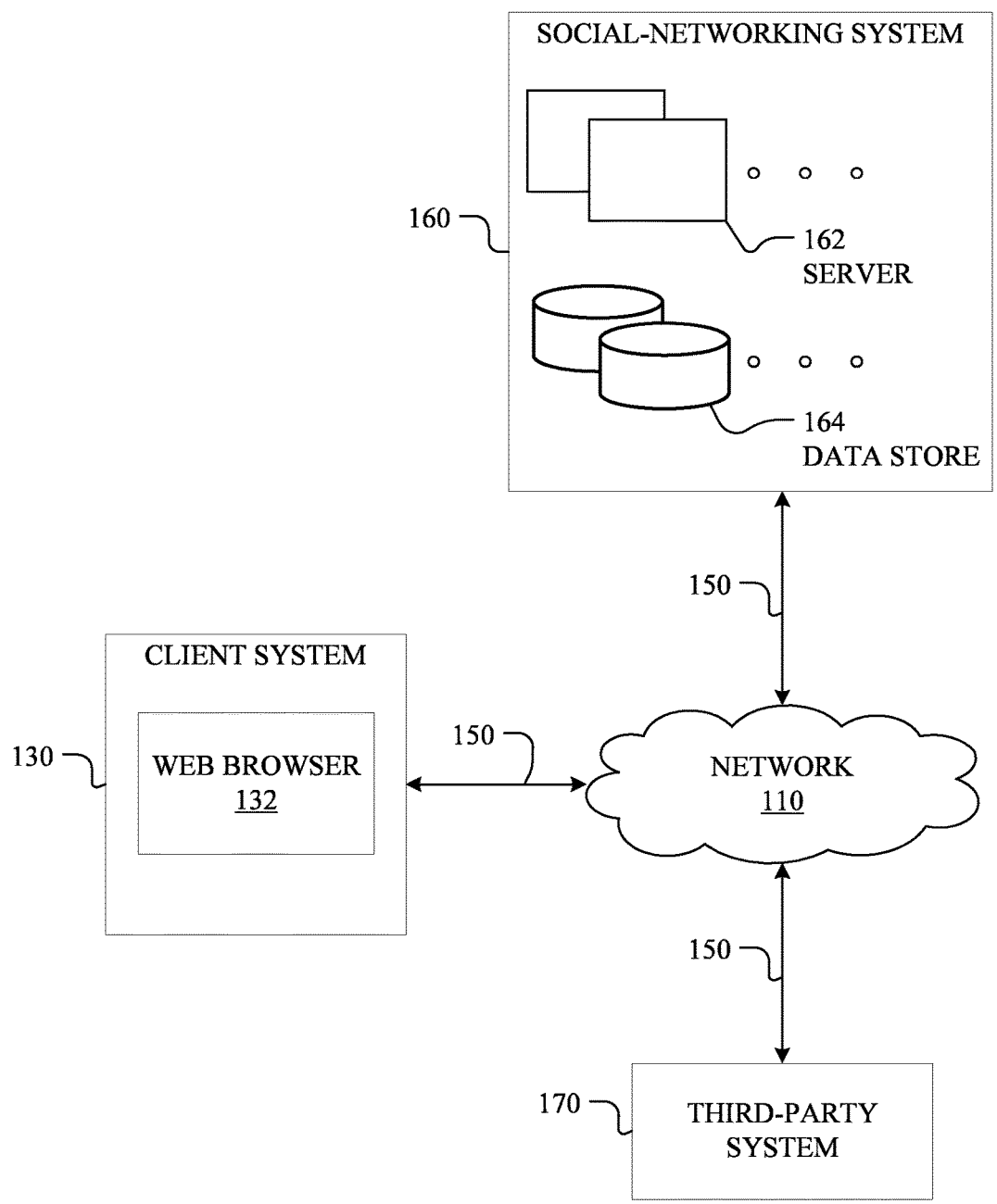
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
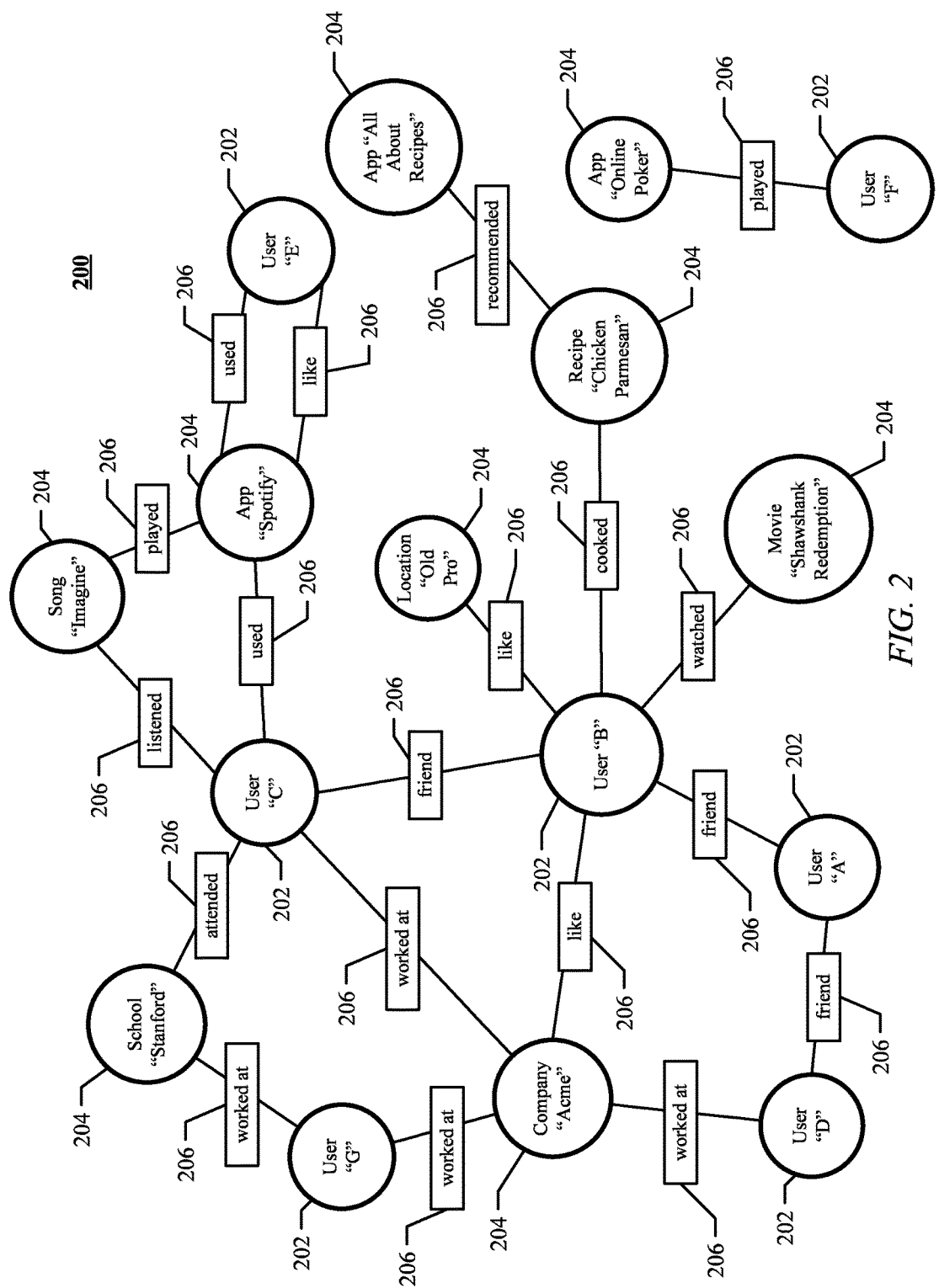
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile pages, content-profile pages, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile pages, external webpages, or any combination thereof. The social-networking system 160 may then generate a search-results page with search results corresponding to the identified content and send the search-results page to the user. The search results may be presented to the user, often in the form of a list of links on the search-results page, each link being associated with a different page that contains some of the identified resources or content. In particular embodiments, each link in the search results may be in the form of a Uniform Resource Locator (URL) that specifies where the corresponding page is located and the mechanism for retrieving it. The social-networking system 160 may then send the search-results page to the web browser 132 on the user's client system 130. The user may then click on the URL links or otherwise select the content from the search-results page to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested page (such as, for example, a user-profile page, a concept-profile page, a search-results page, a user interface/view state of a native application associated with the online social network, or another suitable page of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile pages and respective user nodes 202 or concept nodes 204, such as a profile page named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile pages and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Snippets Generation

In particular embodiments, social-networking system 160 may generate and send for display to a client system 130 a user a snippet-module that includes snippets associated with an entity of the online social network. The entity may be associated with an entity-type such as, for example, a restaurant, a celebrity, a place, an outdoors group, a festival event, or any suitable type of entity. The snippet-module may be generated and sent to the user when the user accesses a profile-page for the entity, or in a search-results or nearby-places page that includes the entity on the online social network. As an example and not by way of limitation, referencing FIG. 3, social-networking system 160 may generate snippet-module 302 when the user accesses a profile-page of the restaurant entity "Japonessa Sushi Cocina." The snippet-module may also be generated as a reaction-card in response to a particular trigger action. As an example and not by way of limitation, referencing FIG. 4, social-networking system 160 may generate a snippet-module as reaction-card 404 in response to users of social-networking system 160 checking in at the bakery "The Mill" in San Francisco. The snippets may correspond to n-grams extracted from online social network posts associated with the entity. Furthermore, each extracted n-gram may include a noun phrase. The noun phrase may include, for example, at least one noun, at least one noun and at least one adjective, at least one noun and at least one conjunction, or any suitable combination thereof. As an example and not by way of limitation, for a restaurant entity "Lulu's Cafe", social-networking system 160 may generate a snippet-module in the restaurant's profile-page on the online social network (which may include a menu of the restaurant, reviews of the restaurant, etc.), where the snippet-module includes noun phrases such as, for example, "royale sandwich," beet bruschetta," "blueberry muffin bread," lemony kale," and "trout scramble." Herein, reference to a snippet may encompass a noun-phrase n-gram, or vice-versa, where appropriate. The term "post" as used herein may include a publication created by a user on a newsfeed page of the online social network, a homepage of the online social network, the user's page (e.g., a post on the user's timeline or wall) on the online social network, a profile-page of the entity on the online social network (e.g. a review on the entity's page), a page of the user's connection (e.g., a post on the wall of the user's first-degree connection or the user's friend) on the online social network, a page of a group (e.g., a post on a wall of a group related to a hobby) on the online social network, or any suitable page on the online social network. As an example and not by way of limitation the publication may include content inputted by the user and does not reference another post on the online social network. As another example and not by way of limitation, the publication may reference another post on the online social network. The publication may be by a second entity, and may reference the first entity in a profile page of the first, entity, or of the second entity, or of a third entity on the online social network. The term "reshare" as used herein may include a publication created by a user on the online social network, where the publication references another post on the online social network (for example, a post may be linked to or embedded in the reshare). While this disclosure focuses on snippets-modules that include content from posts/reviews, this disclosure also contemplates such modules including content from reshares, comments, messages, or other suitable content objects associated with the online social network. More information on snippets-modules may be found in U.S. patent application Ser. No. 14/695,540 filed 24 Apr. 2015, which is incorporated by reference.

In particular embodiments, the snippet-module may include n-grams extracted from content objects of a plurality of object-types associated with the entity on the online social network. An object-type may be, for example, a photo, a post, a review, a comment, a message, an event listing, a webpage, an application, a location, a user-profile page, a concept-profile page, a user group, an audio file, a video, an offer or coupon, or any suitable type of content object. In particular embodiments, the snippet-module may include references indicating content objects from which the snippets were extracted. As an example and not by way of limitation, referencing FIG. 3, snippet-module 302 for the restaurant entity "Japonessa Sushi Cocina" may include "Based on posts and reviews" indicating that the snippets "tempura brie" and "sushi happy hour" are extracted from previous relevant posts and reviews of the restaurant entity "Japonessa Sushi Cocina" on the online social network. Although this disclosure describes generating particular snippet-module for particular entity in a particular manner, the disclosure contemplates generating any suitable snippet-module for any suitable entity in any suitable manner. More information on reaction-cards may be found in U.S. patent application Ser. No. 14/466,269 filed 22 Aug. 2014, which is incorporated by reference.

In particular embodiments, social-networking system 160 may use the snippet-module to display highlights of an entity on the online social network, where the highlights are extracted from content objects of various object-types (e.g., posts, comments, reviews, and messages) for the entity on the online social network. The snippet-module may be beneficial because there could be hundreds or thousands of such content objects for the entity on the online social network and the user may not have time to sift through the content objects. The snippet-module may be beneficial for enabling the user to quickly review the highlights of the entity before making informed decisions associated with the entity. As an example and not by way of limitation, referencing FIG. 3, a user would not want to read all 100+ posts that are tagged with the restaurant entity "Japonessa Sushi Cocina" before deciding whether to order a particular food menu item at the restaurant. As such, snippet-module 302 may indicate that the snippet "tempura brie" is a highlight of the restaurant that people mentioned in previous relevant posts and reviews of the restaurant entity on the online social network. Accordingly, the user may decide to order tempura brie at the restaurant. Furthermore, social-networking system 160 may use a filter and a scoring feature to select for and display only noun-phrase n-grams (or snippets) that surpass a threshold quality. The scoring feature may be beneficial because there may be hundreds of noun-phrase n-grams extracted from the content objects and only a limited number of the noun-phrase n-grams may be useful for display to users on the online social network. The filtering and scoring features may also be beneficial for filtering out irrelevant noun-phrase n-grams. Although this disclosure describes and illustrates particular embodiments of utilizing a snippet-module in a particular manner, the disclosure contemplates any suitable embodiments of utilizing any suitable snippet-module in any suitable manner.

Figure 3:
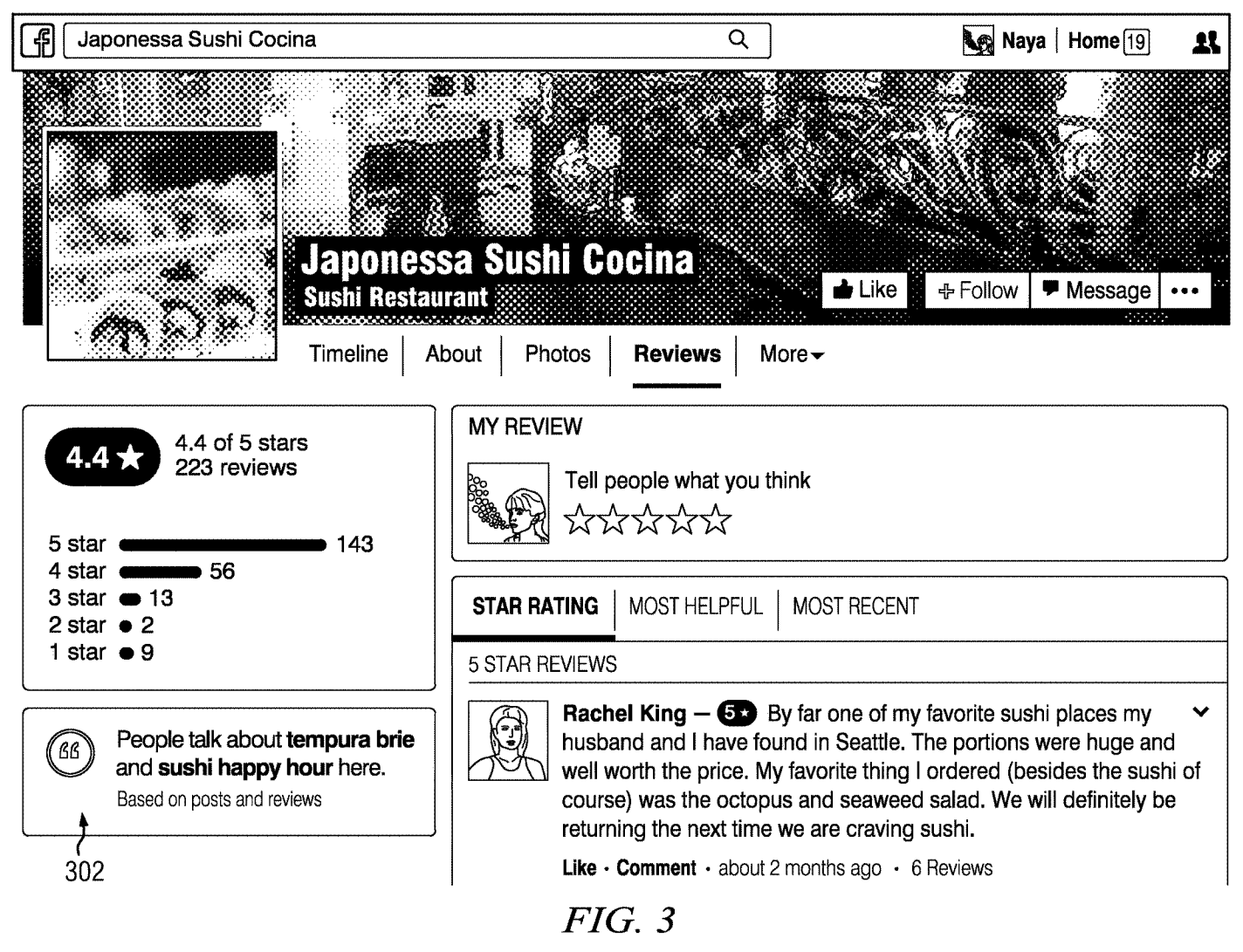

FIG. 3 illustrates an example portion of a profile page that includes snippet-module 302. The profile page may be hosted by social-networking system 160. In the example of FIG. 3, the profile page corresponds to a profile-page of the restaurant "Japonessa Sushi Cocina." The profile-page includes information quantifying feedback from users of social-networking system 160 toward the restaurant such as, for example, information indicating that the restaurant had received 223 posts corresponding to reviews of the restaurant by users of social-networking system 160 and a rating of "4.4 of 5 stars" from the 223 reviewers. The profile-page also includes a subset of the 223 posted reviews such as, for example, a "5 Star" review posted by a user "Rachel King" for the restaurant on the online social network. The profile-page of the restaurant also includes snippet-module 302 generated by social-networking system 160. Snippet-module 302 may include noun-phrase n-grams extracted from content objects of various object-types (e.g., posts, comments, reviews, and messages) relevant to the restaurant entity on the online social network. Accordingly, the extracted noun-phrase n-grams are displayed to users of social-networking system 160 who access the profile-page of the restaurant on the online social network. In the example of FIG. 3, snippet-module 302 indicates that "People talk about tempura brie and sushi happy hour here," where "tempura brie" and "sushi happy hour" correspond to relevant noun-phrase n-grams extracted from previous posts and reviews of the restaurant entity on the online social network. A user may interact with the module, for example by clicking on or selecting a particular noun-phrase such as "tempura brie" or "sushi happy hour" to execute a search query (e.g., keyword query or Graph Search query) based on the noun-phrase the user clicked on or selected. In this example, clicking on the noun-phrase "tempura brie" causes a keyword search query to be executed using the search term "tempura brie". The search query may be restricted to the entity associated with the snippet-module 302 (e.g., the restaurant "Japonessa Sushi Cocina"), may search other entities physically located within a threshold distance of the associated entity, or may search entities selected based on another condition, for example. Alternatively, if one of the noun-phrases in the snippet-module 302 corresponds to a particular entity of the online social network (e.g., a particular user, places, group, etc.), clicking on the noun-phrase may cause a structured search query to be executed that references that entity, or may cause the user to be redirected to the profile-page associated with the entity. Although this disclosure describes and illustrates a particular profile page including a particular snippet-module in a particular manner, the disclosure contemplates any suitable profile page including any suitable snippet-module in any suitable manner.

Figure 4:
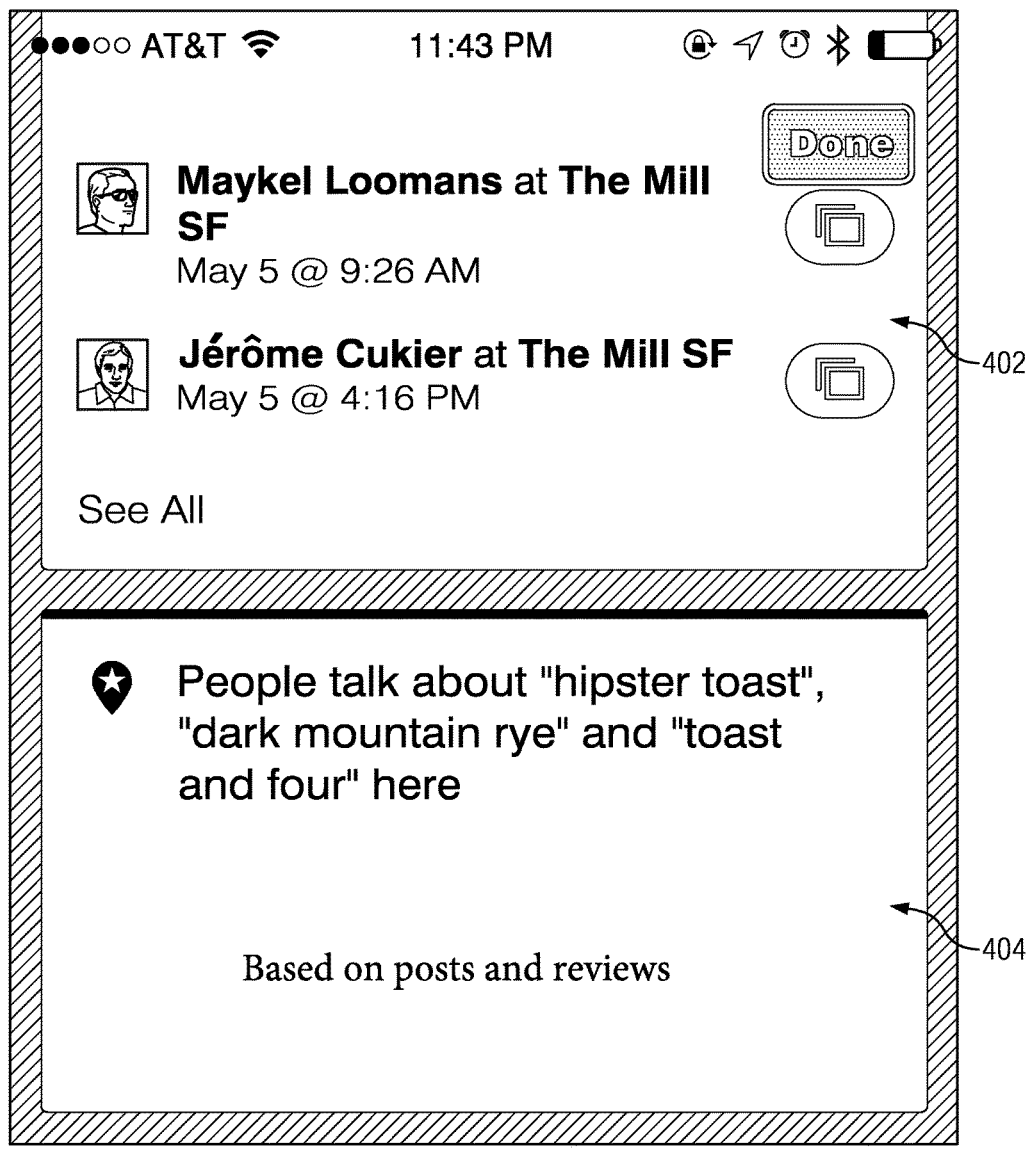
FIGS. 4-5 illustrate example user interfaces of a client system that include example snippet-modules.
Figure 5:

FIGS. 4-5 illustrate example user interfaces of client system 130 that include example snippet-modules. The user interfaces may be generated by social-networking system 160 for a user of client system 130. In particular embodiments, client system 130 may be a mobile computing device such as, for example, a cellular phone of the user. In the example of FIG. 4, social-networking system 160 generates reaction-card 402 in the user interface in response to users "Maykel Loomans" and "Jerome Cukier" checking-in at the bakery "The Mill" in San Francisco, where the users "Maykel Loomans" and "Jerome Cukier" may be first-degree connections (e.g., friends) of the user associated with user-interface. Next, social-networking system 160 generates reaction-card 404 in response to the users "Maykel Loomans" and "Jerome Cukier" checking-in at the bakery. Furthermore, reaction-card 404 includes a snippet-module that includes highlights of the bakery entity "The Mill" on the online social network for display to the user of client system 130. The snippet-module may include noun-phrase n-grams extracted from content objects of various object-types (e.g., menus, posts, comments, reviews, and messages) relevant to the bakery entity on the online social network. In the example of FIG. 4, the snippet-module of reaction-card 404 indicates that "People talk about 'hipster toast', 'dark mountain rye,' and 'toast and four' here," where "hipster toast," "dark mountain rye," and "toast and four" correspond to noun-phrase n-grams extracted from previous posts and reviews of the bakery entity on the online social network.

In the example of FIG. 5, the user interface includes a profile-page for the restaurant entity "Japonessa Sushi Cocina" generated by social-networking system 160 on client system 130. The profile-page includes highlights of the restaurant such as, for example, "1,602 people like this," "Open." "$$," and "Takes Reservations," In addition, the profile-page includes snippet-module 502 that includes further highlights of the restaurant entity on the online social network for display to the user of client system 130. Snippet-module 502 may include noun-phrase n-grams extracted from content objects of various object-types (e.g., posts, comments, reviews, and messages) relevant to the restaurant entity on the online social network. In the example of FIG. 5, snippet-module 502 indicates that "People talk about tempura brie and sushi happy hour here," where "tempura brie" and "sushi happy hour" correspond to noun-phrase n-grams extracted from previous posts and reviews of the restaurant entity on the online social network. As another example, the snippet-module 502 may be included in a review-page (not shown) for the restaurant entity, or in a reviews section of the profile-page for the restaurant entity. Although this disclosure describes and illustrates particular user interfaces including particular snippet-modules in particular manners, the disclosure contemplates any suitable user interfaces including any suitable snippet-modules in any suitable manners.

Figure 6:
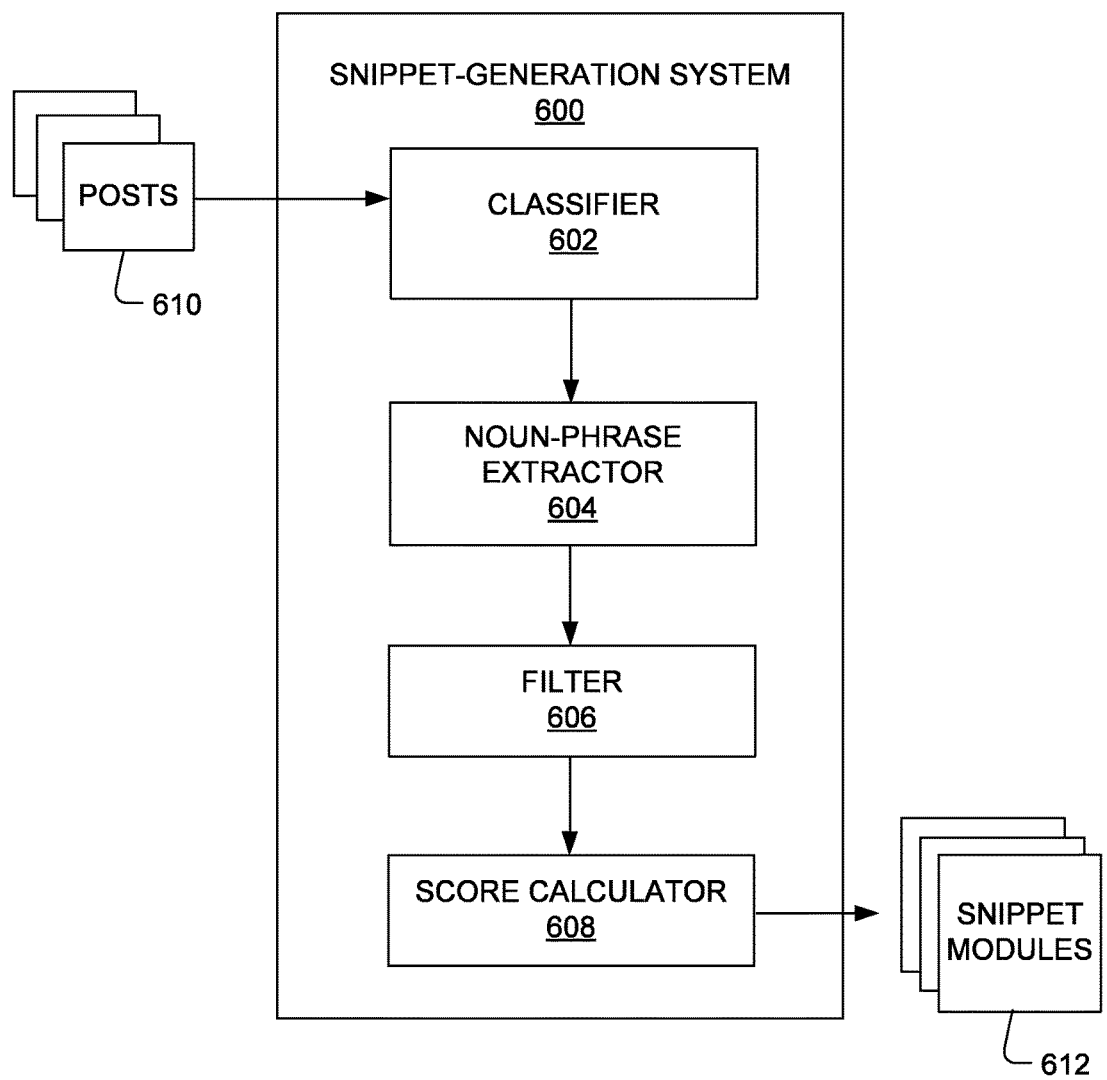
FIG. 6 illustrates an example system for generating snippets in a snippet-module.

FIG. 6 illustrates an example snippet-generation system 600 for generating snippet-modules. Snippet-generation system 160 may be third-party system 170 or may be a part of social-networking system 160. In particular embodiments, snippet-generation system 600 may access one or more posts 610 of an online social network hosted by social-networking system 160, where the posts are associated with an entity of social-networking system 160, and generate one or more snippet-modules 612 for display to a user on the online social network. As an example and not by way of limitation, snippet-generation system 600 may access posts 610 on a profile-page of the restaurant entity "Japonessa Sushi Cocina," and posts 610 on the user's timeline tagged with the restaurant entity (e.g., timeline posts 610 associated with one of the tags "Japonessa Sushi Cocina" or "restaurant"). Snippet-generation system 600 may also generate an updated snippet-module 612 in response to a new post 610. As an example and not by way of limitation, referencing FIG. 3, a new post may be submitted on the profile-page of the restaurant entity "Japonessa Sushi Cocina" while the user accesses the profile-page. In response to the submitted new post, snippet-generation system 600 may generate an updated snippet-module 502 that may include noun-phrase n-grams extracted from the submitted new post. The posts may include public posts (e.g., posts that are generally viewable by all users of the online social network) and non-public or private posts (e.g., posts that are only viewable by a subset of users of the online social network). Each post may include content and metadata associated with the post. The metadata associated with a post may include the name of the post's author, the date and time associated with the post, a location associated with the post (e.g., "San Jose, Calif."), the number of "likes" associated with the post, the number of shares of the post, the number of views of the post, other suitable data associated with the post, or any combination thereof. The metadata associated with the post may also include blurbs and titles of any external webpage linked to in the post, as well as information regarding authors, topics, or sponsorship associated with the post and/or external content (which may either be retrieved from the external content or provided by the external-content provider as pre-tagged information associated with the post). A post may be accessed by snippet-generation system 600 when it is first made (e.g., created or posted) by an author (e.g., a user or entity associated with the online social network).

Classifying Posts

In particular embodiments, snippet-generation system 600 may include classifier 602. Classifier 602 may take as input posts 610 and classify each post 610 as being relevant (e.g., review-like) or irrelevant (e.g., not review-like) to the entity. As an example and not by way of limitation, classifier 602 may take as input posts 610 corresponding to "having burritos that are great at Sanchos" and "having a great time with my family at Sanchos" and associated with restaurant entity "Sanchos." Classifier 602 may classify "having burritos that are great at Sanchos" as relevant (e.g., review-like) to the restaurant entity, and classify "having a great time with my family at Sanchos" as irrelevant (e.g., non-review-like) to the restaurant entity. Each post 610 may be classified based at least on the content of the post 610 and the metadata associated with the post 610. In particular embodiments, classifier 602 may parse the content of each post 610 to extract n-grams from the post 610. As an example and not by way of limitation, classifier 610 may parse the content "having burritos that are great at Sanchos" to extract n-grams "burritos", "great", and "Sanchos." Next, classifier 602 may compare the extracted n-grams of each post 610 with a pre-determined cluster of n-grams associated with an entity-type of the entity such as, for example, restaurant, food, event, landmark, celebrity, country, or any suitable type of entity. The pre-determined cluster of n-grams may include n-grams commonly associated with the entity-type. As an example and not by way of limitation, a pre-determined cluster of n-grams for a Mexican restaurant entity-type may include n-grams commonly found in food menus at restaurants, or, more specifically, in menus of Mexican restaurants, such as, for example, "burritos", "nachos", "tacos", "tortillas", "soup", and "flour." In particular embodiments, classifier 602 may compare the extracted n-grams of each post 610 with the pre-determined cluster of n-grams to determine whether there are one or more matches between the extracted n-grams and the pre-determined cluster (e.g., white list) of n-grams. If the number of matches surpasses a pre-determined match threshold, classifier 602 may classify post 610 as relevant to the entity. As an example and not by way of limitation, classifier 602 may compare the extracted n-grams of "burritos", "great", and "Sanchos" with the pre-determined cluster of n-grams for the Mexican restaurant entity-type (e.g., "burritos", "nachos", "tacos", "tortillas", "soup", and "flour.") and determine that there is one match. If the pre-determined match threshold is zero, classifier 602 may classify "having burritos that are great at Sanchos" as relevant to the restaurant entity "Sanchos." As an example and not by way of limitation, the pre-determined cluster of n-grams may also include sentiment-bearing adjectives that are known to appear in reviews, such as "good", "great", "bad", "horrible", and the like. As an example and not by way of limitation, the presence of menu words near or adjacent to sentiment-bearing adjectives in an n-gram, such as "good burrito", may influence the determination of relevance, e.g., by classifying such n-grams as relevant. In particular embodiments, the cluster (e.g., white list) of terms, such as the menu item terms, may apply to all types of entities, or may be specific to a particular category of entities, such as an industry-vertical or domain, e.g., restaurants, and other clusters of terms may be used in other domains or subdomains (e.g., different industry verticals). There may also be black-lists that may apply to all types of entities, such as a list of words that constitute profanity, or words that are very common, or are otherwise found to be used often, even if it does occur in many entities of the desired type. There may also be a separate black list for each entity category, e.g., a black list of terms for hotels, which may include terms that, if found, indicate that the n-gram is not associated with a hotel. Other categories may include good tourist attractions, such as museums, landmarks, neighborhoods, stores, and so on.

In particular embodiments, classifier 602 may be based on a trained classifier algorithm that identifies whether each post 610 is relevant to an entity. For example, and not by way of limitation, to train the classifier, a group of human trainers may be shown a number of posts (e.g., 1,000, 10,000, 15,000, 20,000, or other number of posts deemed sufficient to obtain acceptable training data). A human trainer may indicate whether each post is review-like or not review-like, and the results may be recorded in the training data for each post. In one example, each human trainer may rate each post on a scale of 1 to 5, with 1 being least like a review and 5 being most like a review. The classifier may use feature values associated with weights in the training phase and when evaluating posts to determine whether they are review-like. The features used by the classifier may include the text, count of menu words, and count of sentiment words (e.g., "good", "great", "bad", "horrible", and the like) in the post. When a given post is evaluated to determine whether it is review-like, the classifier may determine, based on the sum of the weights associated with the feature values for the words in the given post, whether the given post is review-like.

In particular embodiments, classifier 602 may calculate a relevance-score for each post 610 based on the content of the post 610 and the metadata associated with the post 610. The relevance-score may be based on a number of matches between n-grams extracted from the content of the post 610 and a pre-determined cluster of n-grams associated with an entity-type of the entity as discussed above, the author of the post 610 indicated in the metadata, a date and time of the post 610 indicated in the metadata, or any combination thereof. As an example and not by way of limitation, classifier 602 may calculate a relevance-score of 1 for the post 610 "having burritos that are great at Sanchos" based on one match between the extracted n-grams and the predetermined cluster of n-grams for the Mexican restaurant entity-type. Classifier 602 may further increase the relevance-score of the post 610 if the author of the post 610 has a first-degree connection to the user based on social-graph 200 of the user on the online social network. Next, classifier 602 may classify the post 610 as relevant to the entity if the post 610 has a relevance-score greater than a pre-determined threshold relevance-score. Although this disclosure describes classifying particular content in a particular manner, the disclosure contemplates classifying any suitable content in any suitable manner.

Extracting Noun-Phrases

In particular embodiments, snippet-generation system 600 may include a noun-phrase extractor 602. Noun-phrase extractor 602 may extract n-grams that correspond to noun phrases from posts 610 that are classified as being relevant to the entity. The noun-phrase extractor 602 may perform part-of-speech (POS) tagging on the posts 610, and group the resulting POS-tagged tokens to identify candidate noun phrases. The noun-phrase extractor 602 may use a list of a number of different sequences of parts of speech, where each sequence represents a valid noun phrase. Example sequences in the list may include (noun, noun), e.g., "steak house", (adjective, noun), e.g., "great sandwich", (noun, noun, conjunction, noun, noun), e.g., "date night and ballroom dance), or any other sequence of parts of speech that can form a valid noun phrase. Each n-gram that matches one of the sequences in the list is passed on to the next stage in the snippet-generation system 600; n-grams that don't match any of the sequences may be removed from consideration. As an example and not by way of limitation, references to other pages, users, or posts may be excluded from snippets. Accordingly, if a post 610 includes any references to other pages (e.g., in the form of web links), users (e.g., in the form of @mentions), or posts, such references may be excluded from the extracted n-grams, and snippets are less likely to refer to other entities (e.g., other restaurants or users), although snippets may still refer to entities that are named in plain text in posts (e.g., entities not referred to as web links or users not referred to by @mentions). As an example and not by way of limitation, references such as web links and @mentions may be included in the extracted n-grams, in which case the references may appear in the snippets. Although this disclosure describes extracting particular content in a particular manner, the disclosure contemplates extracting any suitable content in any suitable manner.

Filtering N-Grams

In particular embodiments, snippet-generation system 600 may include filter 606. Filter 606 may receive n-grams from the noun-phrase extractor 604 and remove n-grams from consideration based on filtering criteria. As an example and not by way of limitation, the filter 606 may remove noun phrases that appear only in social-networking data associated with the first entity, and noun phrases that appear in less than a threshold number of posts of the plurality of posts. As an example and not by way of limitation, the filter 606 may remove noun phrases that are not associated with a dictionary of noun phrases. For example, a dictionary of commonly-used words or noun phrases, such as phrases used in reviews, may be defined. Noun phrases that are not in the dictionary may be removed from consideration. As an example and not by way of limitation, words or noun phrases that do not appear with sufficient frequency may be removed from consideration. For example, if a noun phrase only appears in one or two of the posts in the corpus, or in a small percentage, e.g., 0.5% of the posts in the corpus, then that word, or noun phrases including that word, may be removed from consideration.

As an example and not by way of limitation, the filter 606 may remove noun phrases that are authored by not more than a pre-determined number of users of the online social network. Each post may have a privacy setting, which may specify that the post is only viewable by friends or friends-of-friends of the user, and phrases from posts that are not visible to the user are not included in a snippet-module that is to be displayed to that user. In this example, a phrase from a post is not included in a snippet-module unless the phrase has appeared in posts by at least a threshold number of authors (e.g., 2, 3, 5, or other appropriate number of authors). This condition may prevent private content, content that is meaningless to the public (e.g., code words), and content that is based on a rare occurrence or a rare opinion from being included in the snippet-module.

In particular embodiments, the filter 606 may remove n-grams that correspond to redundant or non-informative noun phrases from consideration. As an example and not by way of limitation, if a word only appears in one place or one time, then the word is probably not relevant and is excluded. Conversely, if a word appears in more than one place and with at least a threshold number of overall appearances, then the word may be passed on to the next stage in the snippet-generation system 600; n-grams that don't match any of the sequences may be excluded from consideration. As an example and not by way of limitation, brand names and/or brand names that match the entity name may be removed from consideration if the n-gram is an exact match of the brand name or has a threshold number (e.g., 1, 2, or 3) of additional words. N-grams that include brand names and more than the threshold number of additional words may be included for consideration because such n-grams contain more information than just the brand name of the entity. As an example and not by way of limitation, noun-phrase deduplication may be performed using a Jaccard coefficient metric to measure the overlap of noun phrases. In this way, overlapping snippets may be removed from consideration. For example, if two or more n-grams have meaningful overlap, e.g., at least a threshold fraction of the n-grams overlap, then only one of the overlapping n-grams may be selected for consideration. The threshold fraction may be computed as a Jaccard similarity coefficient (e.g., the size of the intersection divided by the size of the union of the two n-grams). The sizes may be measured in words or characters. As an example and not by way of limitation, the sizes of the n-grams may be measured in uni-grams, so the size of "mission burrito" is two uni-grams, and the size of "mission burrito deluxe" is three uni-grams. The threshold fraction, e.g., the threshold Jaccard coefficient, may be, e.g., one-quarter one-third, one-half, two-thirds, or other appropriate fraction. The selected n-gram may be, for example, the n-gram with the highest score (determined as described below), or the longest and highest-scored n-gram. For example, "mission burrito deluxe" may be selected instead of "mission burrito" because both n-grams overlap, and "mission burrito deluxe" is more precise (e.g., has more uni-grams), and between "good mission burrito" and "mission burrito deluxe", the higher-scored n-gram may be selected. In this way, the quality-score for each n-gram in the filtered set of n-grams may be calculated based on the number of uni-grams in the n-gram. Although this disclosure describes filtering particular content in a particular manner, the disclosure contemplates filtering any suitable content in any suitable manner.

Scoring N-Grams

In particular embodiments, snippet-generation system 600 may include score calculator 602. For example, score calculator 602 may calculate a quality-score for each n-gram received from the filter 606, and use the score to determine whether to include the n-gram in a snippet module 612. The calculated scores may also be used to rank the n-grams. As an example and not by way of limitation, the score may be calculated based at least on a term frequency-inverse document frequency (TF-IDF) score of the n-gram associated with social-networking data of the online social network. The TF-IDF scores may be used to identify n-grams whose usages are unique to an extent, but not overly unique. For example, a measure of uniqueness of an n-gram may be determined as a TF-IDF score by dividing the number of times that a particular term occurs at a particular restaurant by the total number of restaurants the term occurs in, e.g., how the particular place compares to other places that are similar. The term frequency (TF) may be the number of times that an n-gram occurs at a particular restaurant, and the restaurants may correspond to the documents for inverse document frequency (IDF). The TF-IDF corpus may correspond to the terms from posts about restaurants, with each noun phrase corresponding to a TF-IDF word. Terms that are unique or nearly unique may be identified and excluded from consideration. Other filtering steps may be applied as well, e.g., removing n-grams that contain addresses, such as street addresses, city names, street names, zip codes, state names, and so on. Although this disclosure describes scoring particular content in a particular manner, the disclosure contemplates scoring any suitable content in any suitable manner.

In particular embodiments, the calculated scores may be used to generate one or more snippets for inclusion in a snippets-module 612. As an example and not by way of limitation, the extracted n-grams may be ranked based upon their associated scores. One or more of the highest-ranked n-grams, e.g., the highest ranked, second-highest-ranked, and third-highest-ranked n-grams, may be selected for use as snippets in a snippets-module 612. That is, a threshold number (e.g., three in this example) of the highest-ranked n-grams may be selected. The selected n-grams may then be used as the text of the snippets-module 612. As an example, the n-grams "tempura brie", "sushi happy hour", "miso-glazed eggplant", and "fried tofu" may be extracted from relevant posts and reviews of the restaurant entity "Japonessa Sushi Cocina" with associated scores of 90, 80, 30, and 50, respectively. If the threshold number of n-grams to be selected is 3, then in this example the n-grams selected for inclusion in the snippet-module 612 are "tempura brie", "sushi happy hour", and "fried tofu", respectively and in that order, because those are the top three n-grams in order of decreasing score. Although this disclosure describes selecting extracted n-grams for use as snippets in a snippets-module 612 in a particular manner, the disclosure contemplates selecting extracted n-grams for use as snippets in a snippets-module 612 in any suitable manner.

Figure 7:
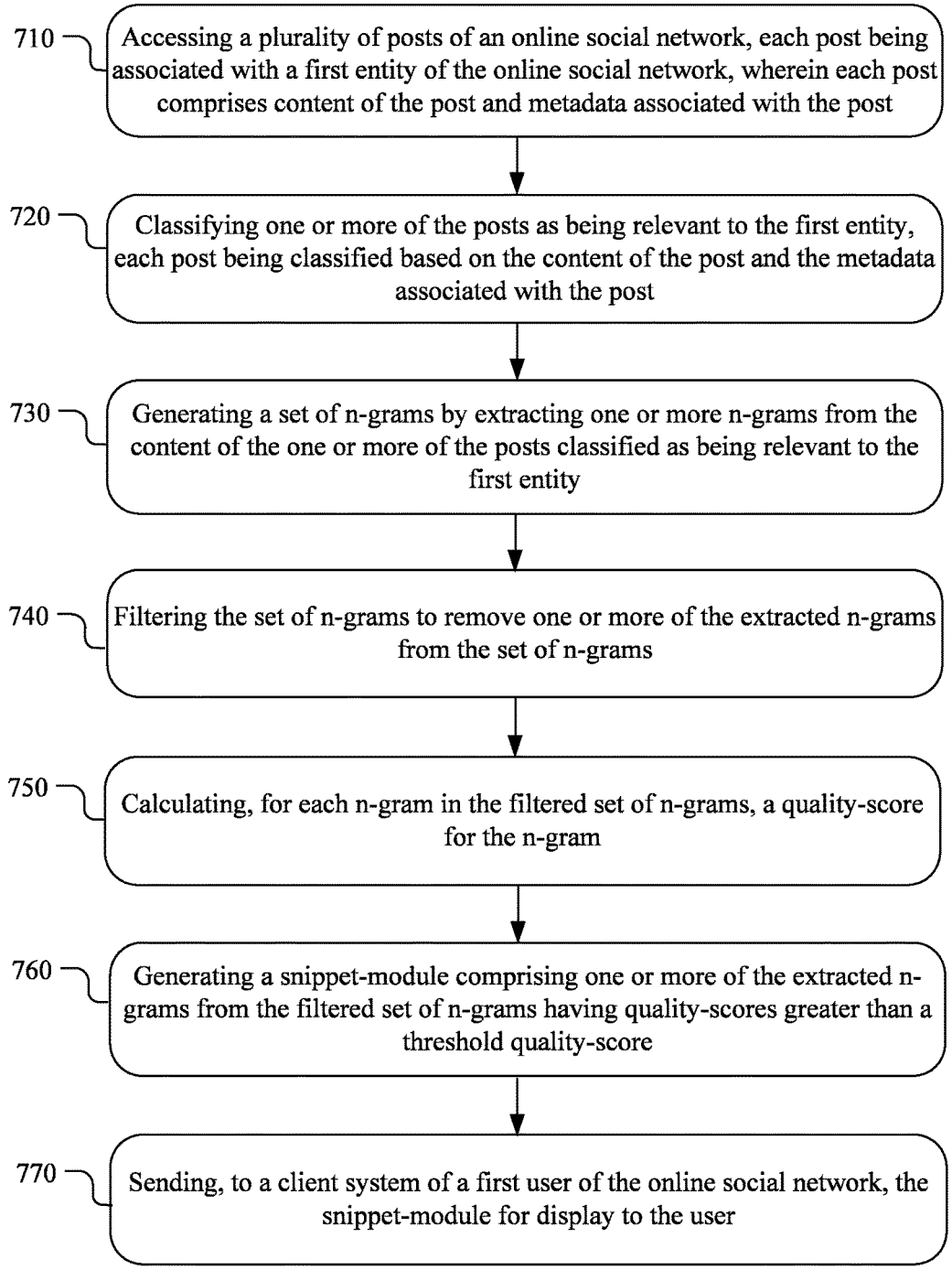
FIG. 7 illustrates an example method for generating snippets.

FIG. 7 illustrates an example method 700 for generating snippets. The method may begin at step 710, where the social-networking system 160 may access a plurality of posts of an online social network, each post being associated with a first entity of the online social network, wherein each post comprises content of the post and metadata associated with the post. At step 720, the social-networking system 160 may classify one or more of the posts as being relevant to the first entity, each post being classified based on the content of the post and the metadata associated with the post. At step 730, the social-networking system 160 may generate a set of n-grams by extracting one or more n-grams from the content of the one or more of the posts classified as being relevant to the first entity. At step 740, the social-networking system 160 may filter the set of n-grams to remove one or more of the extracted n-grams from the set of n-grams. At step 750, the social-networking system 160 may calculate, for each n-gram in the filtered set of n-grams, a quality-score for the n-gram. At step 760, the social-networking system 160 may generate a snippet-module comprising one or more of the extracted n-grams from the filtered set of n-grams having quality-scores greater than a threshold quality-score. At step 770, the social-networking system 160 may sending, to a client system of a first user of the online social network, the snippet-module for display to the user. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating snippets including the particular steps of the method of FIG. 7, this disclosure contemplates any suitable method for generating snippets including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200

(i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

System and Methods

Figure 8:
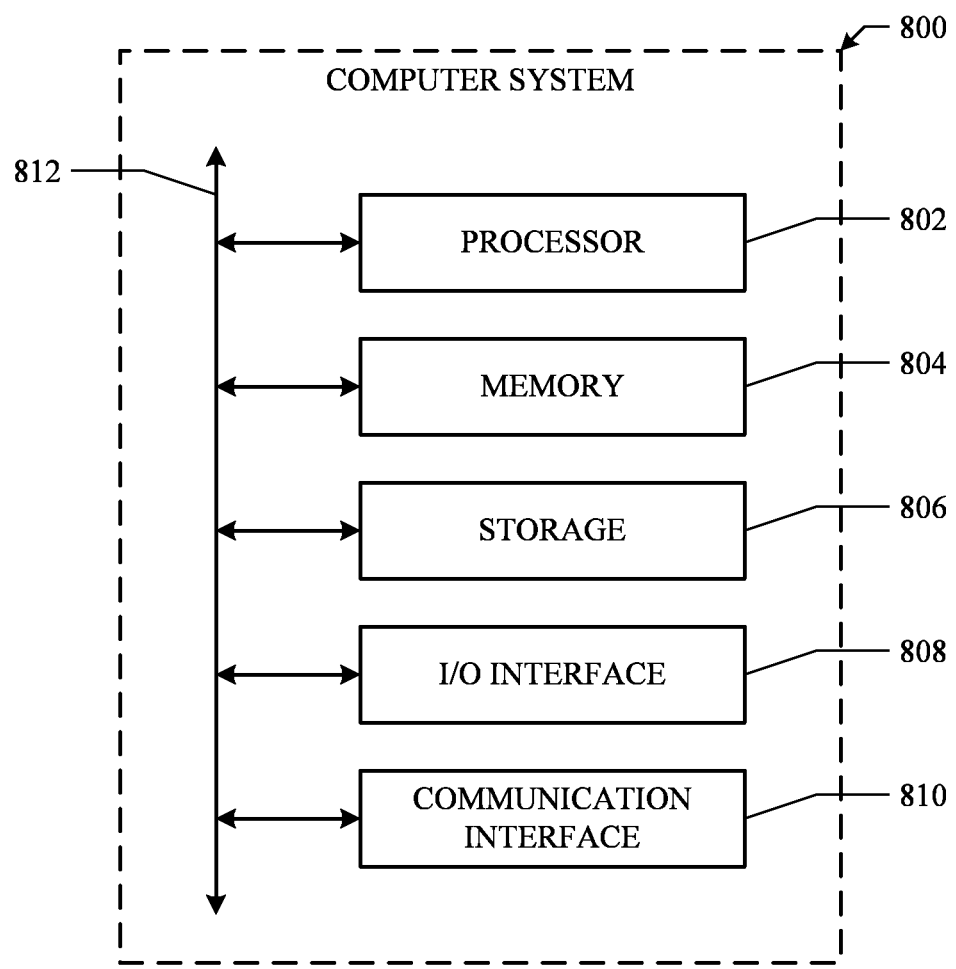
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:

receiving, at the one or more computing devices from a client system associated with a first user of the online social network, a request to access a profile-page for a first entity of the online social network, the first entity being of a particular entity-type;

accessing, by a snippet-generation system of the one or more computing devices, a plurality of posts of the online social network, each post being associated with the first entity of the online social network, wherein each post comprises content of the post and metadata of the post, and wherein each post is linked to the profile-page of the first entity;

accessing, by the one or more computing devices, a set of pre-determined n-grams linked to the particular entity-type of the first entity, wherein the pre-determined n-grams are n-grams that have been determined to be associated with high-quality content about entities of the particular entity-type;

classifying, by a classifier process of the snippet-generation system, one or more of the posts as being relevant to the first entity, each post being classified based on a comparison of pre-determined n-grams and the content of the post and the metadata of the post;

generating, by a noun-phrase extractor process of the snippet-generation system, a set of n-grams by extracting one or more n-grams from the content of the one or more of the posts classified as being relevant to the first entity;

filtering, by a filter process of the snippet-generation system, the set of n-grams to remove one or more of the extracted n-grams from the set of n-grams;

calculating, by a score calculator process of the snippet-generation system, for each n-gram in the filtered set of n-grams, a quality-score for the n-gram;

generating, by the snippet-generation system, a snippet-module comprising one or more of the extracted n-grams from the filtered set of n-grams having quality-scores greater than a threshold quality-score, wherein the snippet-module is generated based on the particular entity-type of the first entity and references the posts that the extracted n-grams are associated with; and sending, from the one or more client systems to the client system of the first user, in response to the request, instructions for presenting the profile-page of the first entity, wherein the profile-page comprises the snippet-module.

2. The method of claim 1, further comprising:
accessing a social graph comprising a plurality of nodes and a plurality of edges connecting the nodes, each of the edges between two of the nodes representing a single degree of separation between them, the nodes comprising:
a first node corresponding to the first entity; and
a plurality of second nodes corresponding to a plurality of second entities associated with the online social network, respectively.

3. The method of claim 1, wherein the plurality of posts comprise one or more of:
a publication by a second entity referencing the first entity in a profile page of the second entity on the online social network; or
a publication by a second entity referencing the first entity in a profile page of the first entity on the online social network.

4. The method of claim 1, wherein the plurality of posts comprise one or more of:
a publication by a second entity referencing the first entity in a profile page of a third entity on the online social network.

5. The method of claim 1, wherein classifying each post as being relevant to the first entity comprises:
applying a classifier algorithm to each post to determine whether the post is relevant, wherein the classifier algorithm is trained to identify relevant posts.

6. The method of claim 1, wherein classifying each post as being relevant to the first entity based on the content of the post comprises:
parsing the content of the post to extract one or more n-grams from the content of the post;
comparing the extracted n-grams with a pre-determined cluster of n-grams linked to an entity-type of the first entity; and
classifying the post as being relevant to the first entity based at least on the comparison of the extracted n-grams with the pre-determined cluster of n-grams.

7. The method of claim 1, wherein classifying each post as being relevant to the first entity comprises:
calculating a relevance-score for the post based on the content of the post and the metadata of the post; and
classifying the post as being relevant to the first entity if the post has a relevance-score above a pre-determined threshold relevance-score.

8. The method of claim 1, wherein the extracted n-grams comprise one or more noun phrases.

9. The method of claim 8, wherein each of the noun phrases comprises:
at least one noun;
at least one noun and at least one adjective; or
at least one noun and at least one conjunction.

10. The method of claim 1, wherein filtering the set of n-grams to remove one or more of the extracted n-grams from the set of n-grams comprises removing one or more of the following n-grams from the set of n-grams:
one or more noun phrases associated with one or more second entities;
one or more redundant noun phrases;
one or more non-informative noun phrases;
one or more brand names;
one or more noun phrases appearing only in non-public posts of the plurality of posts;
one or more noun phrases that are not associated with a dictionary of noun phrases;
or any combinations thereof.

11. The method of claim 10, wherein a non-informative noun phrase comprises a noun associated with profanity.

12. The method of claim 10, wherein the redundant noun phrases comprise one or more overlapped noun phrases having Jaccard's similarity coefficient values above a pre-determined threshold coefficient value.

13. The method of claim 1, wherein filtering the set of n-grams to remove one or more of the extracted n-grams from the set of n-grams comprises removing one or more of the following n-grams from the set of n-grams:
one or more noun phrases that appear only in social-networking data associated with the first entity;
one or more noun phrases that appear in less than a threshold number of posts of the plurality of posts;
one or more noun phrases that are authored by not more than a pre-determined number of users of the online social network; or
any combinations thereof.

14. The method of claim 1, wherein the quality-score for each n-gram in the filtered set of n-grams is calculated based at least on a term frequency-inverse document frequency (TF-IDF) algorithm, the TF-IDF algorithm taking as an input a number of times the n-gram appears in first social-networking data associated with the first entity and a number of times the n-gram appears in second social-networking data associated with a plurality of entities of the online social network associated with an entity-type of the first entity.

15. The method of claim 1, wherein the quality-score for each n-gram in the filtered set of n-grams is calculated based at least on a measure of privacy of the n-gram.

16. The method of claim 1, wherein the quality-score for each n-gram in the filtered set of n-grams is calculated based at least on a number of uni-grams in the n-gram.

17. The method of claim 1, wherein the quality-score for each n-gram in the filtered set of n-grams is calculated based at least on a comparison of an adjective n-gram in the n-gram with a pre-determined cluster of adjective n-grams linked to an entity-type of the first entity.

18. One or more computer-readable non-transitory storage media embodying software that is operable when executed to:
receive, at the one or more computing devices from a client system associated with a first user of the online social network, a request to access a profile-page for a first entity of the online social network, the first entity being of a particular entity-type;
access, by a snippet-generation system of the one or more computing devices, a plurality of posts of the online social network, each post being associated with the first entity of the online social network, wherein each post comprises content of the post and metadata of the post, and wherein each post is linked to the profile-page of the first entity;
access, by the one or more computing devices, a set of pre-determined n-grams linked to the particular entity-type of the first entity, wherein the pre-determined n-grams are n-grams that have been determined to be associated with high-quality content about entities of the particular entity-type;
classify, by a classifier process of the snippet-generation system, one or more of the posts as being relevant to the first entity, each post being classified based on a comparison of pre-determined n-grams and the content of the post and the metadata of the post;

generate, by a noun-phrase extractor process of the snippet-generation system, a set of n-grams by extracting one or more n-grams from the content of the one or more of the posts classified as being relevant to the first entity;

filter, by a filter process of the snippet-generation system, the set of n-grams to remove one or more of the extracted n-grams from the set of n-grams;

calculate, by a score calculator process of the snippet-generation system, for each n-gram in the filtered set of n-grams, a quality-score for the n-gram;

generate, by the snippet-generation system, a snippet-module comprising one or more of the extracted n-grams from the filtered set of n-grams having quality-scores greater than a threshold quality-score, wherein the snippet-module is generated based on the particular entity-type of the first entity and references the posts that the extracted n-grams are associated with; and send, from the one or more client systems to the client system of the first user, in response to the request, instructions for presenting the profile-page of the first entity, wherein the profile-page comprises the snippet-module.

19. A system comprising: one or more processors; and a memory coupled to the processors comprising instructions executable by the processors, the processors operable when executing the instructions to:

receive, at the one or more computing devices from a client system associated with a first user of the online social network, a request to access a profile-page for a first entity of the online social network, the first entity being of a particular entity-type;

access, by a snippet-generation system of the one or more computing devices, a plurality of posts of the online social network, each post being associated with the first entity of the online social network, wherein each post comprises content of the post and metadata of the post, and wherein each post is linked to the profile-page of the first entity;

access, by the one or more computing devices, a set of pre-determined n-grams linked to the particular entity-type of the first entity, wherein the pre-determined n-grams are n-grams that have been determined to be associated with high-quality content about entities of the particular entity-type;

classify, by a classifier process of the snippet-generation system, one or more of the posts as being relevant to the first entity, each post being classified based on a comparison of pre-determined n-grams and the content of the post and the metadata of the post;

generate, by a noun-phrase extractor process of the snippet-generation system, a set of n-grams by extracting one or more n-grams from the content of the one or more of the posts classified as being relevant to the first entity;

filter, by a filter process of the snippet-generation system, the set of n-grams to remove one or more of the extracted n-grams from the set of n-grams;

calculate, by a score calculator process of the snippet-generation system, for each n-gram in the filtered set of n-grams, a quality-score for the n-gram;

generate, by the snippet-generation system, a snippet-module comprising one or more of the extracted n-grams from the filtered set of n-grams having quality-scores greater than a threshold quality-score, wherein the snippet-module is generated based on the particular entity-type of the first entity and references the posts that the extracted n-grams are associated with; and send, from the one or more client systems to the client system of the first user, in response to the request, instructions for presenting the profile-page of the first entity, wherein the profile-page comprises the snippet-module.

20. The method of claim 1, wherein the profile-page of the first entity is a webpage accessed by a browser client on the client system.

21. The method of claim 1, wherein the profile-page of the first entity is a user interface of a native application installed on the client system.

22. The system of claim 19, wherein the processors are further operable when executing the instructions to:

access a social graph comprising a plurality of nodes and a plurality of edges connecting the nodes, each of the edges between two of the nodes representing a single degree of separation between them, the nodes comprising:

a first node corresponding to the first entity; and a plurality of second nodes corresponding to a plurality of second entities associated with the online social network, respectively.

23. The system of claim 19, wherein the plurality of posts comprise one or more of:

a publication by a second entity referencing the first entity in a profile page of the second entity on the online social network; or a publication by a second entity referencing the first entity in a profile page of the first entity on the online social network.

24. The system of claim 19, wherein the plurality of posts comprises one or more of:

a publication by a second entity referencing the first entity in a profile page of a third entity on the online social network.

25. The system of claim 19, wherein the instruction to classify each post as being relevant to the first entity comprises instructions to:

apply a classifier algorithm to each post to determine whether the post is relevant, wherein the classifier algorithm is trained to identify relevant posts.

26. The system of claim 19, wherein the instructions to classify each post as being relevant to the first entity comprises instructions to:

parse the content of the post to extract one or more n-grams from the content of the post;

compare the extracted n-grams with a pre-determined cluster of n-grams linked to an entity-type of the first entity; and classify the post as being relevant to the first entity based at least on the comparison of the extracted n-grams with the pre-determined cluster of n-grams.

27. The system of claim 19, wherein the instructions to classify each post as being relevant to the first entity comprises instructions to:

calculate a relevance-score for the post based on the content of the post and the metadata of the post; and classify the post as being relevant to the first entity if the post has a relevance-score above a pre-determined threshold relevance-score.

28. The system of claim 19, wherein the extracted n-grams comprise one or more noun phrases.

29. The system of claim 28, wherein each of the noun phrases comprises:
    at least one noun;
    at least one noun and at least one adjective; or
    at least one noun and at least one conjunction.

30. The system of claim 19, wherein the instructions to filter the set of n-grams to remove one or more of the extracted n-grams from the set of n-grams comprises instructions to remove one or more of the following n-grams from the set of n-grams:
    one or more noun phrases associated with one or more second entities;
    one or more redundant noun phrases;
    one or more non-informative noun phrases;
    one or more brand names;
    one or more noun phrases appearing only in non-public posts of the plurality of posts;
    one or more noun phrases that are not associated with a dictionary of noun phrases;
    or any combinations thereof.

31. The system of claim 30, wherein a non-informative noun phrase comprises a noun associated with profanity.

32. The system of claim 30, wherein the redundant noun phrases comprise one or more overlapped noun phrases having Jaccard's similarity coefficient values above a pre-determined threshold coefficient value.

33. The system of claim 19, wherein the instructions to filter the set of n-grams to remove one or more of the extracted n-grams from the set of n-grams comprises instructions to remove one or more of the following n-grams from the set of n-grams:
    one or more noun phrases that appear only in social-networking data associated with the first entity;
    one or more noun phrases that appear in less than a threshold number of posts of the plurality of posts;
    one or more noun phrases that are authored by not more than a pre-determined number of users of the online social network; or
    any combinations thereof.

34. The system of claim 19, wherein the quality-score for each n-gram in the filtered set of n-grams is calculated based at least on a term frequency-inverse document frequency (TF-IDF) algorithm, the TF-IDF algorithm taking as an input a number of times the n-gram appears in first social-networking data associated with the first entity and a number of times the n-gram appears in second social-networking data associated with a plurality of entities of the online social network associated with an entity-type of the first entity.

35. The system of claim 19, wherein the quality-score for each n-gram in the filtered set of n-grams is calculated based at least on a measure of privacy of the n-gram.

36. The system of claim 19, wherein the quality-score for each n-gram in the filtered set of n-grams is calculated based at least on a number of uni-grams in the n-gram.

37. The system of claim 19, wherein the quality-score for each n-gram in the filtered set of n-grams is calculated based at least on a comparison of an adjective n-gram in the n-gram with a pre-determined cluster of adjective n-grams linked to an entity-type of the first entity.

38. The system of claim 19, wherein the profile-page of the first entity is a webpage accessed by a browser client on the client system.

39. The system of claim 19, wherein the profile-page of the first entity is a user interface of a native application installed on the client system.

* * * * *